United States Patent

Seabra

[11] Patent Number: 5,564,757
[45] Date of Patent: Oct. 15, 1996

[54] PUSH-IN LOCKING JOINT FOR SMALL DIAMETER TUBES

[75] Inventor: Helio L. Seabra, Sao Paulo, Brazil

[73] Assignee: Metalurgica Detroit S.A., Diadema-SP, Brazil

[21] Appl. No.: 306,971

[22] Filed: Sep. 16, 1994

[30] Foreign Application Priority Data

Mar. 30, 1994 [BR] Brazil .................................. 9401351

[51] Int. Cl.⁶ .................................................. F16L 21/06
[52] U.S. Cl. ............................................. 285/322; 285/38
[58] Field of Search .................................... 285/322, 323, 285/38

[56] References Cited

U.S. PATENT DOCUMENTS

| 461,311 | 10/1891 | Brown . |  |
|---|---|---|---|
| 1,083,742 | 1/1914 | Hutchinson . |  |
| 1,911,423 | 5/1931 | Biller . |  |
| 2,172,650 | 8/1938 | Couty . |  |
| 2,190,419 | 7/1937 | Evarts . |  |
| 2,543,088 | 11/1947 | Woodling . |  |
| 3,414,299 | 12/1965 | Roe . |  |
| 4,005,883 | 2/1977 | Guest | 285/322 |
| 4,685,706 | 8/1987 | Kowal | 285/322 |
| 4,867,484 | 9/1989 | Guest | 285/322 X |
| 4,905,766 | 3/1990 | Dietz et al. . |  |
| 4,998,755 | 3/1991 | Reeder . |  |
| 5,141,262 | 8/1992 | Bartholomew . |  |
| 5,171,045 | 12/1992 | Pasbrig | 285/322 X |
| 5,230,539 | 7/1993 | Olson | 285/323 |

FOREIGN PATENT DOCUMENTS 8502412   5/1985   Brazil .

Primary Examiner—Dave W. Arola
Attorney, Agent, or Firm—Jacobson, Price, Holman & Stern, PLLC

[57] ABSTRACT

An external tubular body of a locking joint includes an axial cylindrical passage followed by a short radially widened section to accommodate a tube. Another further radially widened section is formed to receive a hermetically sealing O-ring. A section with a short, conically tapering surface followed by a straight section leads to an inverted conically tapering section to facilitate insertion of a glove. The glove is a tubular body with a plurality of longitudinal cuts extending to a frontal ring relief. The cuts form flexible stems, externally equipped, at an opposite extremity with a back bevelled edge ring and, internally by two rows of teeth. The teeth reduce the internal size of the glove to bite into an outer surface of an inserted tube to lock the tube within the external tubular body as the back bevelled edge ring is slid along a tapered surface of the external tubular body during withdrawal of the tube from the tubular body.

5 Claims, 2 Drawing Sheets

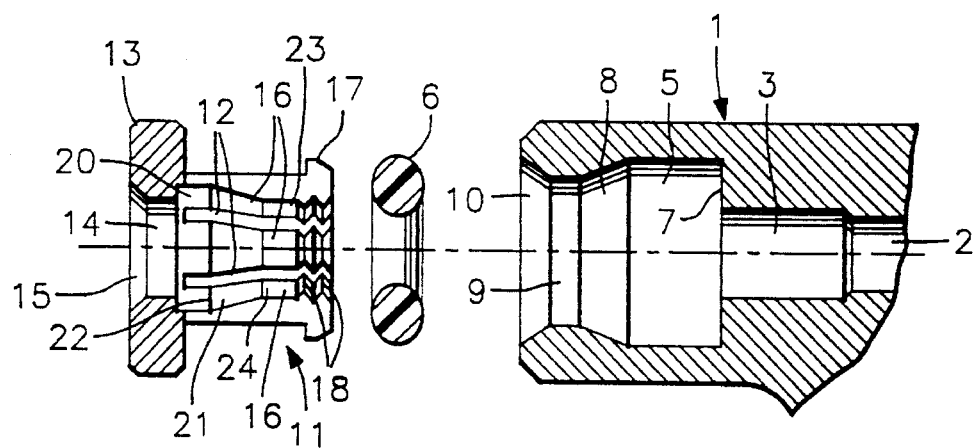
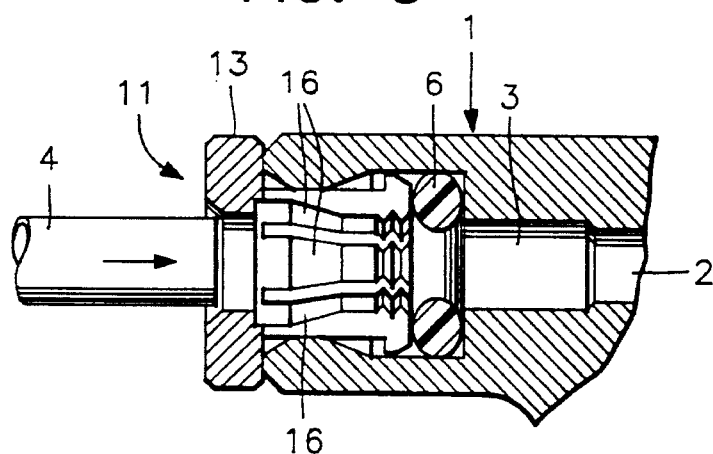
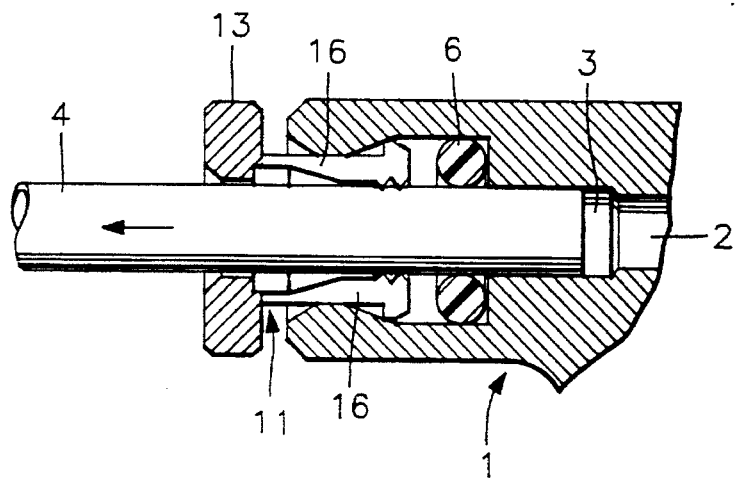

PUSH-IN LOCKING JOINT FOR SMALL DIAMETER TUBES

FIELD OF THE INVENTION

The present invention relates to an improvement in a push-in locking joint for small diameter tubes whose development aims at reducing the size of the locking joint, and consequently its manufacturing time, factors which are reflected in its final cost, while increasing grasping strength of the locking joint, which is particularly beneficial in use with polyurethane tubes or other similar tubes.

BACKGROUND OF THE INVENTION

Known tube joints for small diameter tubes of the push-in type are generally characterized by an external tubular body which has manufactured in its interior, an adaptation to receive a glove with flexible stems equipped with a row of teeth, that, after the insertion of the tube, the glove is retracted so as to press the stems and, consequently the teeth against the external tube surface.

These joints have been considered to be too long, primarily as a function of the length of the glove. The glove is generally characterized by a tubular body equipped, in one of the extremities of a ring relief, to act as a stop when retracted, during the act of locking a tube. The body includes a straight section that, for a certain distance includes a plurality of longitudinal cuts, distributed in an equidistant way, ending at the other extremity of the glove at an external ring relief and a row of teeth placed near its internal edge.

This construction, besides increasing the length of the locking joint, requires substantial consumption of very expensive material, and the use of specialized equipment and manpower, so as to manufacture these parts perfectly. However, the straight section, without cuts, of the glove body was not necessary and the prior locking joints did not lock, with due efficiency, the pipes made of polyurethane or similar material.

SUMMARY OF THE INVENTION

By the present invention, an improvement is introduced in a push-in locking joint for small diameter tubes constituted by the manufacture of a glove with a reduced length, with longitudinal cuts going up to a back edge of a traction relief ring and having two ring teeth rows on an internal edge of an opposite extremity of the glove, a construction that is suitable for the locking of polyurethane or pipes made of similar material.

This construction allows for a reduction in the length of the internal groove of the joint body and, consequently, a smaller length of the joint itself, which means less time and less use of equipment and specialized manpower for its manufacture, being thus characterized as a reducing factor in cost and an increase in security, by avoiding the formation of defects in the tube which might cause leaks.

BRIEF DESCRIPTION OF THE DRAWINGS

So as to better understand the objective of this invention, reference shall be made to the attached drawings where:

FIG. 2 shows, in a longitudinal cross section, the separate parts aligned for assembly, FIG. 3 depicts, in a longitudinal cross section the parts assembled and receiving the insertion of the tube, and FIG. 4 shows, in a longitudinal cross section, the tube locking, after its insertion to the bottom of the tubular body, and the subsequent traction of the ring relief, so that its teeth bite the surface of the tube, progressively locking the tube with more axial pressure required to remove the tube.

DETAILED DESCRIPTION OF THE PREFERRED EMBODIMENTS

Figure 1:
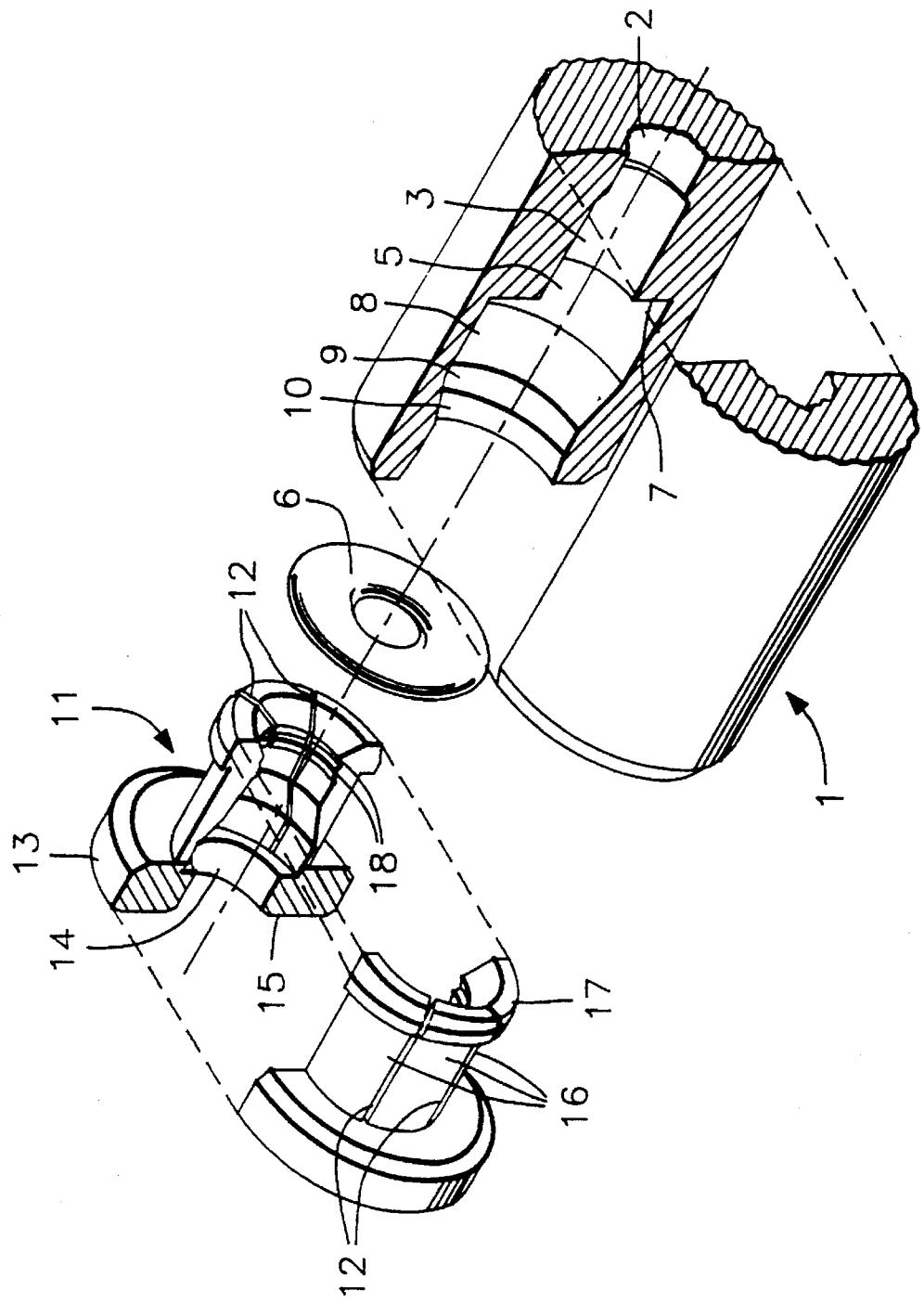
FIG. 1 shows, in an upper posterior blown up view, and a longitudinal cut of its components, with a focus on longitudinal cuts applied to the glove, going up to the traction relief ring of the glove and including two ring rows of teeth.

The present invention includes an external tubular body 1 with an axial cylindrical passage 2 leading into a short radially widened section 3 of a diameter to accommodate a tube 4 and, moving towards an end of body 1, a further radially widened section 5 to receive a hermetically sealing O-ring 6, which is supported by a wall 7 between section 5 and section 3. The section 5 leads to a short, conically tapering surface 8 terminating in a straight axial section 9. Section 9 terminates at an inverted conically tapering surface 10 to facilitate the insertion of glove 11 into body 1.

Glove 11 is made of a tubular body with a plurality of longitudinal cuts 12 extending to a frontal ring relief 13 used for the gripping and subsequent locking of the tube 4. An axial passage 14 terminates at a conically tapered aperture 15 for receipt of a tube. The cuts 12 form flexible stems 16 having external bevelled edge ring 17 at an opposite extremity of the glove 11 from the ring relief 13. Two rows of teeth 18 are formed internally of the glove 11 at the end of the glove 11 at which bevelled edge ring 17 is located.

The axial passageway 14 of the glove 11 includes a straight axially extending section 20 located at one end of the glove's tubular body adjacent to the ring relief 13. A conical surface 21 tapers inwardly at one end 22 from the straight axially extending section 20 in a direction towards the other end of said tubular body. Another straight axially extending section 23 extends from the other end 24 of the conical surface 21. The two rows of teeth 18 are located at the other end of the tubular body. The straight axially extending section 20 has an internal diameter greater than an internal diameter of the other straight axially extending section 23.

In FIG. 3, glove 11 is shown inserted into body 1. The tube 4 is then inserted into the interior of the glove 11 within the tubular body 1 up to the end of the short widened section 3 of the tubular body 1 as shown in FIG. 3. Upon withdrawal of the tube 4 in the direction indicated by an arrow in FIG. 4, the bevelled edge ring 17 is forced against the conically tapered surface 8. The flexible stems are thereby pressed to converge towards tube 4 and the teeth 18 bite against the outer surface of the tube 4 to lock the tube 4 in place.

I claim:

1. A locking joint comprising:

a tubular body having an axial passageway including a tapered conical surface tapering outwardly from one end of said tubular body in a direction towards opposite end of said tubular body, a glove made of a tubular body having two ends with a relief ring located at one end of said glove with an external diameter of said relief ring being greater than an internal diameter of said axial passageway of said tubular body and said glove including longitudinal cuts extending from the other end of said glove along a central portion of said glove and terminating at said relief ring at said one end of said glove and forming a plurality of flexible stems in said glove, said glove including an axial passageway having a straight axially extending section located at said one end of said tubular body adjacent said relief ring, a conical surface tapering inwardly at one end from said straight axially extending section in a direction towards the other end of said tubular body, another straight axially extending section extending from the other end of said conical surface, and two rows of teeth located at said other end of said tubular body, said straight axially extending section having an internal diameter greater than an internal diameter of said another straight axially extending section, said glove being located in said one end of said tubular body, and a pipe inserted into said tubular body and said glove in a direction from said one end of said tubular body towards said opposite end of said tubular body with said pipe and said glove defining means for initially engaging said pipe and said glove for movement together and so that upon attempting to withdraw said pipe in a direction of said one end of said tubular body said plurality of stems engage said tapered conical surface of said tubular body and are forced radially inwardly so that said another straight axially extending section of said axial passageway of said tubular body of said glove and said two rows of teeth are moved into contact with said pipe to lock said pipe within said one end of said tubular body.

2. A locking joint according to claim 1, wherein an O-ring is located in said tubular body around said pipe.

3. A locking joint according to claim 1, wherein said flexible stems are compressible to allow for insertion of said glove into said tubular body until said relief ring contacts said one end of said tubular body.

4. A locking joint comprising:

a tubular body having an axial passageway including a straight axially extending section located adjacent to one end of said tubular body, a tapered conical surface tapering outwardly from said straight axially extending section in a direction towards an opposite end of said tubular body, and a tapered conical surface tapering outwardly from said straight axially extending section in a direction towards and terminating at said one end of said tubular body, a glove made of a tubular body having two ends with a relief ring located at one end of said glove with an external diameter of said relief ring being greater than an internal diameter of said axial passageway of said tubular body and said glove including longitudinal cuts extending from the other end of said glove along a central portion of said glove and terminating at said relief ring at said one end of said glove and forming a plurality of flexible stems in said glove, said glove including an axial passageway having a straight axially extending section located at said one end of said tubular body adjacent said relief ring, a conical surface tapering inwardly at one end from said straight axially extending section in a direction towards the other end of said tubular body, another straight axially extending section extending from the other end of said conical surface, and two rows of teeth located at said other end of said tubular body, said straight axially extending section having an internal diameter greater than an internal diameter of said another straight axially extending section, said glove being located in said one end of said tubular body, and a pipe inserted into said tubular body and said glove in a direction from said one end of said tubular body towards said opposite end of said tubular body with said pipe and said glove defining means for initially engaging said pipe and said glove for movement together and so that upon attempting to withdraw said pipe in a direction of said one end of said tubular body said plurality of stems engage said outwardly tapered conical surface of said tubular body and are forced radially inwardly so that said another straight axially extending section of said axial passageway of said tubular body of said glove and said two rows of teeth are moved into contact with said pipe to lock said pipe within said one end of said tubular body.

5. A locking joint according to claim 4, wherein an external diameter of said central portion of said glove is equal to an internal diameter of said straight axially extending section of said tubular body.

* * * * *